March 3, 1931.   A. E. ZIMMERMANN   1,794,940
ABSORBENT LID DEVICE FOR FRYING PANS
Filed Nov. 11, 1929
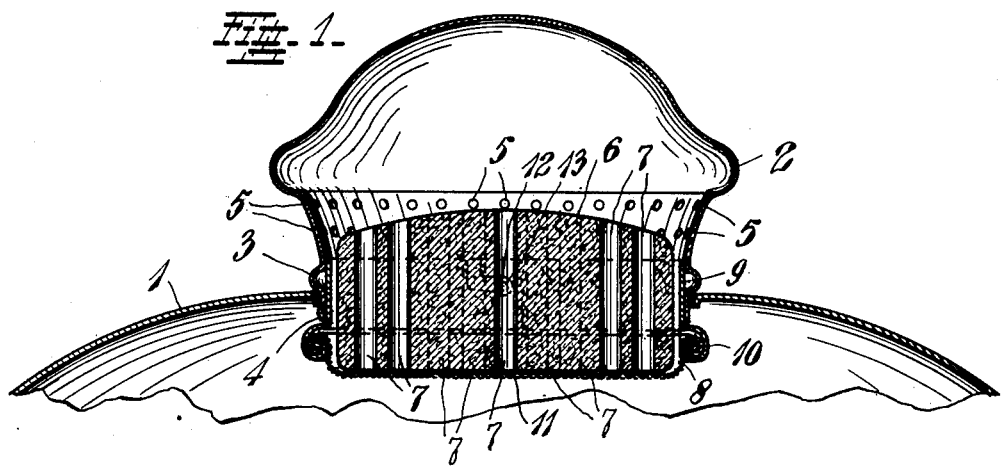
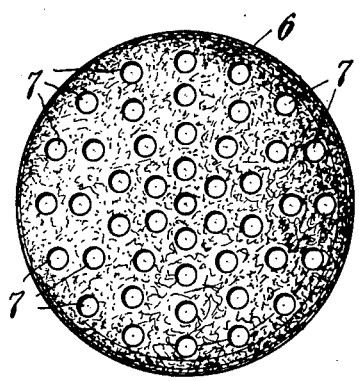
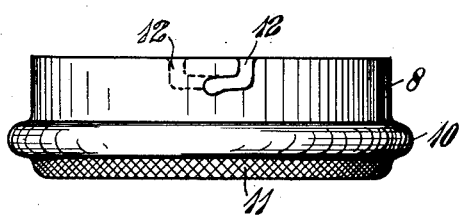
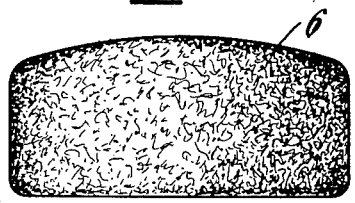
INVENTOR.
Anna E. Zimmermann
BY
Clarence Perdew
ATTORNEY.

Patented Mar. 3, 1931

1,794,940

UNITED STATES PATENT OFFICE

ANNA E. ZIMMERMANN, OF CINCINNATI, OHIO

ABSORBENT LID DEVICE FOR FRYING PANS

Application filed November 11, 1929. Serial No. 406,281.

My invention relates to lids for cooking vessels, and its object is to provide such lids with absorbent means in such manner that the absorbent material may readily be put in place or taken out, and so that the parts involved may be readily kept clean, and to provide the absorbent means in such a manner that contamination of the food cooked in the vessel, by the absorbent means, is avoided. Other objects will appear in the course of the following description.

I accomplish the above objects by the device illustrated, for example, in the accompanying drawing, in which—

Figure 1 is a partial vertical section of a lid embodying my invention;

Fig. 2 is a plan view of the absorbent means;

Fig. 3 is a side elevation of the same; and

Fig. 4 is a detail side elevation of the detachable support for the absorbent means.

The vessel lid 1, which may be the lid of a frying pan or the like, has a central aperture down into which is slipped the dome 2, which has a bead 3 around it bearing on the lid all around the edge of the aperture, and a detent distension 4 which snaps under this edge. This holds the dome 2 firmly on the lid, yet allows it to be detached if necessary for thorough cleaning of the lid and dome. This dome 2 increases in diameter upwardly from its connection with the lid 1, and has, for some distance upward, a series of perforations 5, above which the top of the dome is raised to afford an ample condensation space. In this respect, my invention is like that of my Patent No. 1,368,007, issued February 8, 1921.

My present invention provides for utilizing the dome of said prior patent, which therein allows water, juices, greases or the like to escape through the perforations in the side walls of the dome, to flow down in all directions therefrom to the rim of the frying pan or the like, which is so constructed, along with the lid, that these substances will pass back into the vessel instead of being spattered on surrounding objects, or into the fire, igniting the contents of the vessel. I am aware that absorbent substances, such as charcoal, have been placed in suitably constructed lids to absorb the odors coming from the foods being cooked; but so far as I am aware, the absorbent always has been in fragments which fall through the openings provided for access of the substances to the absorbent, and get into the food being cooked, practically spoiling the food, inasmuch as these particles, though they may not be injurious, cause unpleasantness to the one eating the food, amounting, with some persons to repulsiveness.

I avoid these possibilities by providing the absorbent, such as charcoal or the like, in one piece, such as the piece 6, having a number of passages 7 up through it such as to add to the bottom, side and top absorbent surfaces a very considerable interior area of absorbent surfaces constituted by the sides of these numerous passages 7.

A cup 8 receives this absorbent piece 6, and is composed of a ring 9 having its lower edge rolled in forming a bead 10 in which is held the periphery of a foraminous bottom 11 for the cup, which bottom, as shown, is slightly cupped downward from its connection at the bead 10, so that it presents interstices laterally all around, as well as downwardly on its bottom. In the top edge of the ring 9 are bayonet slots 12. This ring 9 is of such diameter as to slip snugly up inside the lower part of the lid dome 2 where the latter fastens to the lid 1, until the bead 10 of the ring comes snugly up against the lower edge or rim of the dome 2 extending below the inner surface of the lid 1. This brings the slots 12, which have slipped onto inward distensions 13 of the dome 2, to lock by turning the cup 8.

The piece 6 of absorbent material is cylindrical, of materially less diameter than that of the inside of the cup 8, and has a flat bottom to rest on the foraminous cup bottom 11, and preferably has its top convex; and its height is so limited that it extends only up into the region of the lateral perforations 5 of the dome 2. Such pieces of charcoal or the like may be readily molded with the passages 7 therein; and it is highly preferable that their corners at top and bottom be well rounded and therefore not easily broken off. Thus molded, of firm texture, and smooth outside as well as in the passages 7, the piece 6 may occupy the receptacle described, over the food in the vessel, until it is saturated with the odors it absorbs from the food steam and vapors, yet at no time in this period will it release any of its particles to fall through the foraminous bottom 11 into the food. As here shown, this bottom is of wire cloth of rather close mesh; and this is preferable to coarse meshed netting, or to perforated metal, because it affords an ample opening from the interior of the vessel to the absorbent piece 6, yet is smooth, soft and yielding, and thus not liable to abrade or break the absorbent material. The cup 8 may be removed readily for cleaning its interior, as well as the interior of the dome 2, upon which the absorbent piece 6 may be replaced with a new clean one if the old piece has become so saturated as to make this advisable. Such saturation is reached, however, only after a long period of use.

It will be seen that the vapors, juices and the like escape through the perforations 5 of the dome 2, which acts as a vent to prevent raising of the lid at the vessel rim by such rising fluids, as in my patent mentioned; and that these substances in my present invention must pass all around and through the piece 6 to escape, in which action they part with their objectionable odors to the absorbent piece 6. I have found this construction effective with foods of such pronounced odor, as onions, cabbage and the like, and certain meats, fish and the like, as would cause much objection when cooked in ordinary vessels.

I claim:

1. In a device of the character described, in combination with a cooking vessel lid comprising a dome having vent perforations, a cup having a foraminous bottom and having its top rim in said dome below said perforations, and a piece of absorbent material having upright passages therethrough, held in said cup with its top near said perforations and with its sides materially spaced from the walls of said cup.

2. In a device of the character described, in combination with a cooking vessel lid comprising a dome with vent perforations, a cup having a foraminous bottom and having its top rim in said dome below said perforations, said dome having inward projections and said cup having slots in its upper rim receiving said projections, and a piece of absorbent material having upright passages therethrough, held in said cup with its top near said perforations and with its sides materially spaced from the walls of said cup.

ANNA E. ZIMMERMANN.